United States Patent [19]

Kuwana et al.

[11] Patent Number: 4,842,344

[45] Date of Patent: Jun. 27, 1989

[54] ANTISKID APPARATUS

[75] Inventors: Kazutaka Kuwana, Toyota; Hiromu Kuromitsu, Chiryu; Hiroaki Takeuchi; Nobuyasu Nakanishi, both of Toyota; Tomohiko Hosoda, Nagoya, all of Japan

[73] Assignees: Aisin Seiki Kabushiki Kaisha, Kariya; Toyota Jidosha Kabushiki Kaisha, Toyota, both of Japan

[21] Appl. No.: 100,447

[22] Filed: Sep. 24, 1987

[30] Foreign Application Priority Data

Sep. 24, 1986 [JP] Japan .................. 61-223840

[51] Int. Cl.$^4$ .................. B60T 8/48; B60T 15/02
[52] U.S. Cl. .................. 303/117; 303/68; 303/116
[58] Field of Search .............. 303/10, 61-63, 303/68, 69, 113, 114, 115, 116, 117, 119; 188/181 A; 137/625.69

[56] References Cited

U.S. PATENT DOCUMENTS

| | | |
|---|---|---|
| 3,521,934 | 7/1970 | Leiber . |
| 3,746,402 | 7/1973 | Hickner et al. .............. 303/115 |
| 3,787,094 | 1/1974 | Harned et al. .............. 303/113 |
| 3,801,161 | 4/1974 | Sharp .............. 303/116 |
| 3,844,623 | 10/1974 | Parsons et al. .............. 303/119 |
| 3,848,934 | 11/1974 | Grosseau .............. 303/119 |
| 3,975,061 | 8/1976 | Konde et al. .............. 303/68 X |
| 4,138,165 | 2/1979 | Blomberg et al. .............. 303/61 X |
| 4,492,414 | 1/1985 | Kozakai et al. . |
| 4,552,413 | 11/1985 | Fujii et al. . |
| 4,597,611 | 7/1986 | Nishimura et al. . |
| 4,602,824 | 7/1986 | Nishimura et al. . |
| 4,605,263 | 8/1986 | Ando et al. . |
| 4,618,189 | 10/1986 | Nakanishi et al. . |
| 4,624,508 | 11/1986 | Adachi et al. . |
| 4,636,008 | 1/1987 | Adachi et al. . |
| 4,636,101 | 1/1987 | Adachi et al. . |
| 4,655,509 | 4/1987 | Ando et al. . |
| 4,660,899 | 4/1987 | Ando et al. . |
| 4,703,979 | 11/1987 | Nakanishi et al. .............. 303/119 X |
| 4,730,879 | 3/1988 | Adachi et al. .............. 303/119 X |

FOREIGN PATENT DOCUMENTS

| | | |
|---|---|---|
| 2363619 | 7/1974 | Fed. Rep. of Germany . |
| 2519835 | 11/1976 | Fed. Rep. of Germany . |
| 49-28307 | 7/1974 | Japan . |
| 56-142733 | 7/1981 | Japan . |
| 58-199258 | 11/1983 | Japan . |
| 60-25834 | 2/1985 | Japan . |
| 60-25835 | 2/1985 | Japan . |
| 61-222850 | 10/1986 | Japan . |
| 62-187638 | 8/1987 | Japan . |
| 62-187640 | 8/1987 | Japan . |
| 62-191260 | 8/1987 | Japan . |
| 2141195A | 12/1984 | United Kingdom . |
| 2168771A | 6/1986 | United Kingdom . |
| 2175362A | 11/1986 | United Kingdom . |

OTHER PUBLICATIONS

Heinz Leiber et al., "Antilock System for Passenger Car with Digital Electronics-Design and Operation", 1979.

Primary Examiner—Andres Kashnikow
Assistant Examiner—Timothy Newholm
Attorney, Agent, or Firm—Burns, Doane, Swecker & Mathis

[57] ABSTRACT

An antiskid apparatus including a changeover valve disposed in a line connecting a master cylinder and a wheel brake, the changeover valve being changed over between a first mode for cutting off the wheel brake from the master cylinder and connecting the wheel brake to a reservoir, and a second mode for alternately connecting the wheel brake to a pump and the reservoir when an antiskid operation is performed, a pressure increase control valve connected between the pump and changeover valve with wheel brake pressure serving as a control signal pressure, and a pressure decrease control valve connected between the wheel brake and reservoir with wheel brake pressure serving as a control signal pressure. The pressure increase control valve decreases an amount of pressurized oil flow from the pump to the wheel brake when wheel brake pressure decreases and increases the amount of pressurized oil flow from the pump when wheel brake pressure increases. The pressure decrease control valve increases an amount of pressurized oil flow from the wheel brake to the reservoir when wheel brake pressure decreases and decreases the amount of pressurized oil flow from the wheel brake when wheel brake pressure increases. The pressure increase and decrease control valves are formed integral.

4 Claims, 3 Drawing Sheets

ANTISKID APPARATUS

BACKGROUND

The present invention relates to an antiskid apparatus for automotive vehicles.

An example of a conventional antiskid apparatus for automotive vehicles is disclosed in the specification of Japanese Patent Publication (KOKOKU) No. 49-28307.

As shown in FIG. 2, the conventional antiskid apparatus has an inlet solenoid valve 3 arranged between a master cylinder 1 and a wheel brake 2, and an outlet solenoid valve 5 arranged between the wheel brake 2 and a reservoir 4. A pump 6 is arranged between the reservoir 4 and the master cylinder 1 and the circuit arrangement is such that a working fluid discharged from the pump 6 circulates to the master cylinder 1 and the inlet solenoid 3.

In the above-described conventional antiskid apparatus, antiskid control is carried out by switching the inlet solenoid valve 3 and outlet solenoid valve 5. However, in accordance with control based solely on switching of the solenoid valves 3 and 5, a decrease in pressure in the wheel brake 2 takes place slowly and response is poor when the vehicle is traveling on a road surface having a low coefficient of friction $\mu$, even though the inlet solenoid valve 3 is closed and the outlet solenoid valve 5 is open. Conversely, when there is an increase in the pressure, it is desired that the pressure increase take place slowly in order to avoid sudden braking. However, since pump discharge fluid is connected directly to a point of the line between the master cylinder 1 and inlet solenoid valve 3, wheel brake pressure undergoes a violent increase. As a result, wheel lock-up tends to occur and it becomes difficult to carry out antiskid control.

SUMMARY OF THE DISCLOSURE

The present invention seeks to eliminate the aforementioned drawback of the prior-art antiskid apparatus and its object is to provide a novel antiskid apparatus that performs control in such a manner that when an antiskid operation is carried out, a decrease in wheel brake pressure develops a steep slope at the time of the pressure decrease and an increase in wheel brake pressure develops a gentle slope at the time of the pressure increase, thereby making it possible to improve brake response and prevent sudden braking and to achieve excellent antiskid control.

According to the present invention, the foregoing object is attained by providing an antiskid apparatus for an automotive vehicle comprising: a master cylinder; a wheel brake; a reservoir; a pump; a changeover valve disposed in a line connecting the master cylinder and the wheel brake, the changeover valve being changed over between a first mode for cutting off the wheel brake from the master cylinder and connecting the wheel brake to the reservoir, and a second mode for alternately connecting the wheel brake to the pump and reservoir when an antiskid operation is performed; a pressure increase control valve connected in a line between the pump and the changeover valve with wheel brake pressure serving as a control signal (reference) pressure, the pressure increase control valve decreasing an amount of pressurized oil flow from the pump to the wheel brake when the wheel brake pressure decreases and increasing the amount of pressurized oil flow from the pump when the wheel brake pressure increases; and a pressure decrease control valve disposed in a line between the wheel brake and the reservoir with the wheel brake pressure serving as a control signal (reference) pressure, the pressure decrease control valve increasing an amount of pressurized oil flow from the wheel brake to the reservoir when the wheel brake pressure decreases and decreasing the amount of pressurized oil flow from the wheel brake when the wheel brake pressure increases.

In a preferred embodiment of the invention, the pressure increase control valve and the pressure decrease control valve are integrally formed.

In operation, the wheel brake is alternately connected to the pump and reservoir by controlling the changeover of the changeover valve when antiskid control is performed.

If the vehicle is traveling on a road surface having a low coefficient of friction $\mu$ at the time of the antiskid operation, there is a corresponding drop in the wheel brake pressure. Therefore, when under this condition, there occurs a minute increase in the wheel brake pressure, the pressure increase control valve in which the wheel brake pressure serves as the control signal pressure decreases the amount of pressurized oil flow from the pump to the wheel brake in comparison with the amount of flow that prevails when the vehicle is traveling on a road surface having a high coefficient of friction $\mu$. As a result, the increase in wheel brake pressure takes place gently. When there occurs a decrease in the wheel brake pressure, the pressure decrease control valve increases the amount of pressurized oil flow from the wheel brake to the reservoir in comparison with the amount of flow that prevails when the vehicle is traveling on a road surface having a high coefficient of friction $\mu$. Consequently, the wheel brake pressure is sharply reduced.

If the vehicle is traveling on a road surface having a high coefficient of friction $\mu$, on the other hand, there is a rise in the wheel brake pressure, which is the control signal pressure. Therefore, when, under this condition, there occurs a minute increase in the wheel brake pressure, the pressure increase control valve increases the amount of pressurized oil flow from the pump to the wheel brake, so as to cause a sudden increase in the wheel brake pressure. When there occurs a decrease in the wheel brake pressure, the pressure decrease control valve decreases the amount of pressurized oil flow from the wheel brake to the reservoir in comparison with the amount of flow that prevails when the vehicle is traveling on a road surface having a low coefficient of friction $\mu$. Consequently, the decrease in the wheel brake pressure takes place gently.

The antiskid apparatus of the present invention is advantageous in that when an antiskid operation is performed, it is possible to readily achieve control for a low $\mu$ road surface that requires a rapid reduction in the wheel brake pressure and a slow increase, and for a high $\mu$ road surface that requires a slow reduction in the wheel brake pressure and a rapid increase. This is made possible by a simple mechanical arrangement in which the pressure increase control valve actuated by the wheel brake pressure is connected between the pump and wheel brake, and the pressure decrease control valve similarly actuated by the wheel brake pressure is connected between the wheel brake and reservoir.

Other features and advantages of the present invention will be apparent from the following description taken in conjunction with the accompanying drawings.

DETAILED DESCRIPTION

A preferred embodiment of an antiskid apparatus will now be described with reference to FIG. 1.

Figure 1:
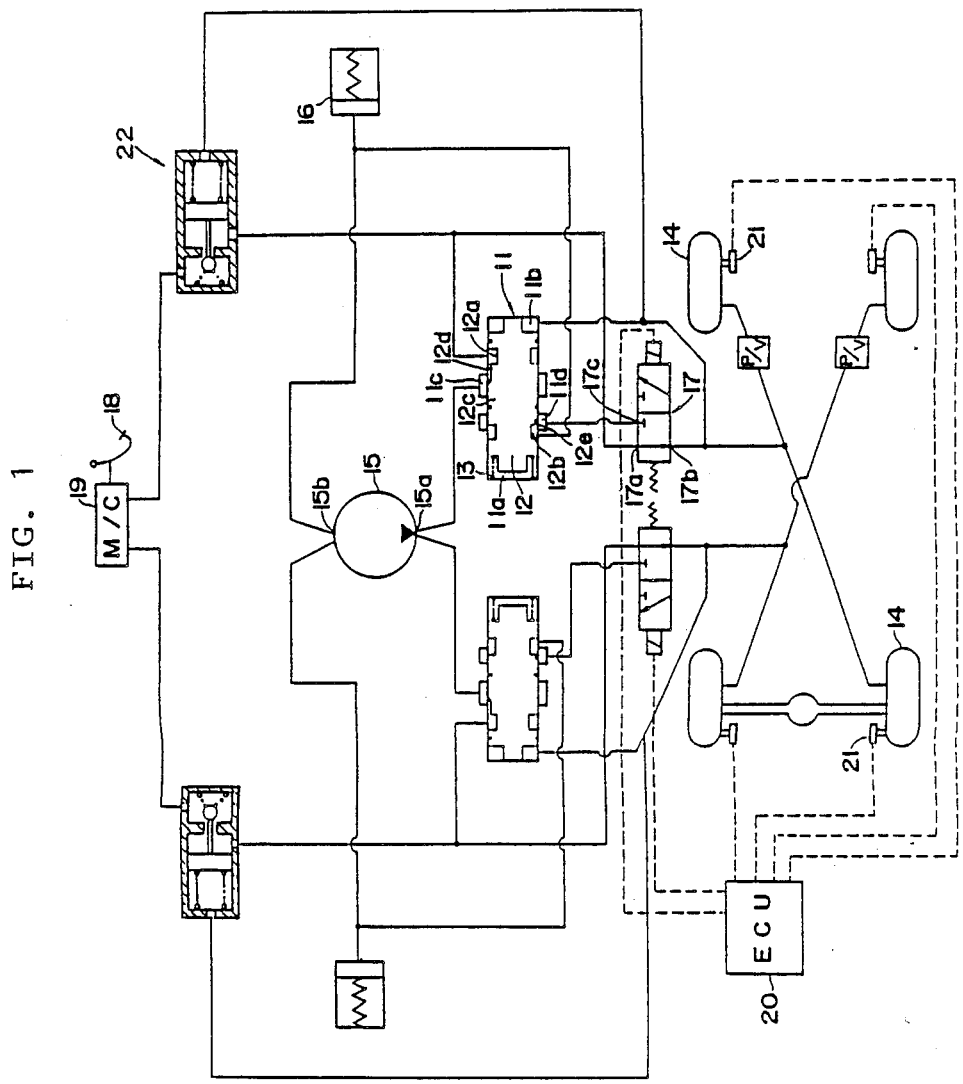
FIG. 1 is a hydraulic circuit diagram illustrating an embodiment of an antiskid apparatus according to the present invention.
Figure 2:
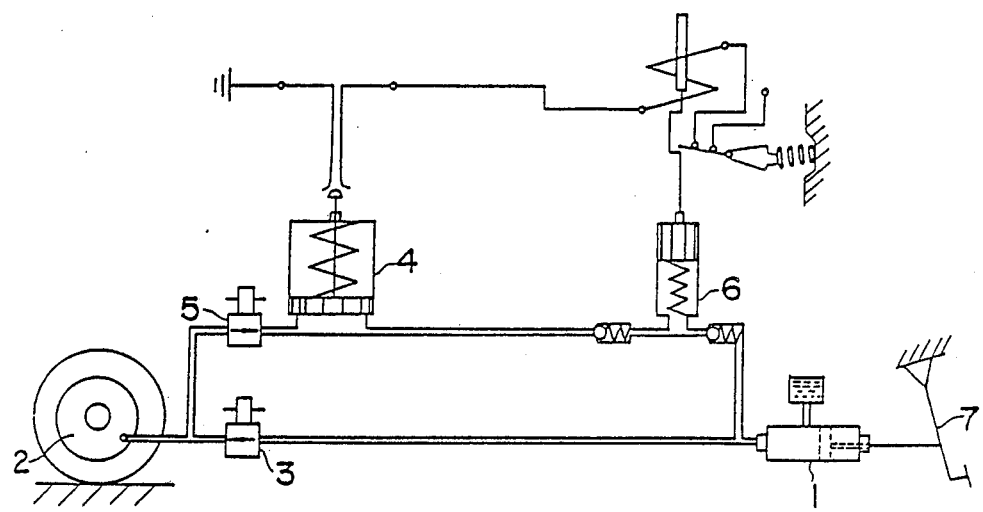
FIG. 2 is a hydraulic circuit diagram illustrating an antiskid apparatus according to the prior art.

FIG. 1 illustrates an embodiment of the present invention applied to 2-channel, 4-sensor brake system in which both channels are identically constructed. Accordingly, in the description that follows, only one channel shown on the right side will be described.

Figure 3:
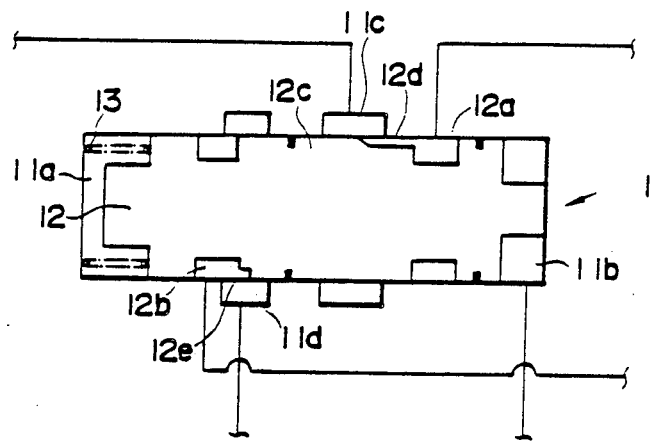
FIG. 3 is an enlarged portion of FIG. 1, showing in more detail the hydraulic control valve.

A hydraulic control valve (pressure increase and decrease control valves) 11 having a spool 12 is urged rightwardly in FIG. 1 by a spring 13 loaded in an oil chamber 11a located at the left end of the spool 12 in FIG. 1. The spool 12 is formed to include a pair of grooves 12a, 12b and a land 12c. A slit 12d formed in the outer peripheral portion of the land 12c communicates with the groove 12a, which is located on the right side in FIG. 1. The land 12c also has a slit 12e which communicates with the groove 12b, located on the left side in FIG. 1 of the land 12c. The hydraulic control valve is shown in more detail in FIG. 3.

A wheel brake 14 is connected to an oil chamber 11b on the right end of spool 12 in hydraulic control valve 11 and introduces the wheel brake pressure which acts against the spring 13. A pump 15 has a discharge port 15a connected to a pump pressure inlet port 11c of the valve 11. The pump pressure inlet port 11c communicates with the slit 12d at all times and throttles the pump pressure as the spool 12 slides. The groove 12b on the left side of the spool 12 is connected to a reservoir 16 at all times. Also connected to the reservoir 16 is the intake port 15b of the pump 15.

A 3-port, 2-position solenoid valve (changeover valve) 17 is arranged in a line between the hydraulic control valve 11 and the wheel brake 14. The valve 17 has a first port 17a connected to a master cylinder 19 linked to a brake pedal 18 via a cut off valve 22, a second port 17b connected to the wheel brake 14, and a third port 17c connected to a port 11d communicating with the slit 12e of the hydraulic control valve 11. When in the normal position, the solenoid valve 17 communicates the first port 17a with the second port 17b and cuts off the third port 17c. When the solenoid valve 17 is changed over by a signal from a computerized electronic control unit (ECU) 20, the first port 17a is cut off and the second port 17b is communicates with the third port 17c.

The groove 12a of hydraulic control valve 11 is connected to a point in a line between the first port 17a of the solenoid valve 17 and the master cylinder 19.

Numeral 21 denotes a sensor for sensing the rotational speed of the corresponding wheel and for applying a signal indicative of the sensed speed to the electronic control unit 20.

The operation of the foregoing antiskid apparatus will now be described.

At the time of an ordinary braking operation, the driver steps down on the brake pedal 18, in response to which pressurized oil from the master cylinder 19 is supplied to the wheel brake 14 via the first port 17a and the second port 17b of the solenoid valve 17, as a result of which the usual braking force is applied.

When the sensor 21 senses that lock-up of the corresponding vehicle wheel is about to occur at sudden braking, the solenoid valve 17 is changed over by a signal from the electronic control unit (ECU) 20. As a result, the first port 17a is cut off to shut off the pressurized oil from the master cylinder 19, and the second port 17b is communicated with the third port 17c to discharge the pressurized oil from the wheel brake 14 into the reservoir 16 through the second port 17b, third port 17c, port 11d, slit 12e and groove 12b, thereby reducing the wheel brake pressure.

When there occurs a minute increase in wheel brake pressure, the solenoid valve 17 is changed over again to cut off the third port 17c and communicate the first port 17a with the second port 17b, whereby the pressurized oil from the pump 15 is supplied to the wheel brake 14 via the pump inlet port 11c of the valve 11, slit 12d, groove 12a, and the first and second ports 17a, 17b of solenoid valve 17.

If antiskid control is performed on a road surface having a low $\mu$, the cylinder pressure of the wheel brake 14 will be low and, hence, there will be a drop in pressure internally of the oil chamber 11b of the hydraulic control valve 11. As a result, the spool 12 is slid rightward, as shown in FIG. 1, under the urging force of the spring 13. Consequently, if the wheel brake pressure is raised slightly by the pump 15, the flow of pressurized oil from the pump the inlet port 11c to the groove 12a is throttled by the slit 12d, so that the wheel brake pressure rises in gentle fashion. If the wheel brake pressure decreases by changing over the solenoid valve 17, the discharge of pressurized oil from the wheel brake 14 to the reservoir 16 increases since there is an increase in the connection surface area between the groove 12b and port 11d of valve 11. A sharp decrease in pressure is achieved due to the increase in pressurized oil discharge.

If antiskid control is performed on a road surface having a high $\mu$, on the other hand, the cylinder pressure of the wheel brake 14 will be high and, hence, there will be a rise in pressure internally of the oil chamber 11b of hydraulic control valve 11. As a result, the spool 12 is slid leftward in FIG. 1 against the force of the spring 13. Consequently, there is an increase in the connection surface area between the pump inlet port 11c and groove 12a and a decrease in the connection surface area between the port 11d and groove 12b due to the throttling action of the slit 12e. Accordingly, if there occurs a slight increase in the wheel pressure on a high $\mu$ road surface, the supply of the pressurized oil from the pump 15 to the wheel brake 14 is increased to achieve a sharp rise in pressure. Conversely, if there occurs a slight decrease in the wheel pressure on the high $\mu$ road surface, the discharge of the pressurized oil from the wheel brake 14 to the reservoir 16 is throttled, so that the pressure decrease takes place gently.

It will be understood from the foregoing description that the pump pressure inlet port 11c of hydraulic pressure control valve 11 and the groove 12a and the slit 12d of the spool 12 construct a pressure increase control valve, while the port 11d, the groove 12b and the slit 12e construct a pressure decrease control valve.

In the above-described embodiment, the cut-off valve 22 is interposed between the master cylinder 19 and solenoid valve 11 and is adapted to act the master cylinder pressure and the cylinder pressure of the wheel brake 14 into opposition between the master cylinder 19 and solenoid valve 17, and to cut off communication between the master cylinder 19 and the solenoid valve 17 when the cylinder pressure of the wheel brake 14 decreases. At the time of the antiskid operation, the groove 12a of the solenoid valve 17 and the master cylinder 19 are cut off by the cut-off valve 22 when the pump pressure is introduced to the wheel brake 14 by the solenoid valve 17. This makes it possible to prevent pedal shock.

As many apparently widely different embodiments of the present invention can be made without departing from the spirit and scope as disclosed and claimed hereinbelow, it is to be understood that the invention is not limited to the specific embodiments thereof except as defined in the appended claims.

What is claimed is:

1. An antiskid apparatus for an automotive vehicle comprising:

a master cylinder;

a wheel brake;

a reservoir;

a pump;

a changeover valve positioned in a line connecting said master cylinder and the wheel brake, the changeover valve including means for defining a first mode of the changeover valve and a second mode of the changeover valve, the first mode cutting off said wheel brake from said master cylinder and connecting the wheel brake to said reservoir, and the second mode alternately connecting said wheel brake to said pump and reservoir when an antiskid operation is performed;

a pressure increase control valve connected in a line between said pump and the changeover valve with wheel brake pressure serving as a control signal pressure, said pressure increase control valve including means for decreasing and increasing an amount of pressurized oil flow, said pressure increase control valve decreasing the amount of pressurized oil flow from said pump to said wheel brake when the wheel brake pressure decreases and increasing the amount of pressurized oil flow from said pump when the wheel brake pressure increases; and a pressure decrease control valve disposed in a line between said wheel brake and said reservoir with the wheel brake pressure serving as a control signal pressure, said pressure decrease control valve including means for increasing and decreasing an amount of pressurized oil flow, said pressure control valve increasing the amount of pressurized oil flow from said wheel brake to said reservoir when the wheel brake pressure decreases and decreasing the amount of pressurized oil flow from said wheel brake when the wheel brake pressure increases, wherein said pressure increase control valve and said pressure decreases control valve are integrally formed as a hydraulic control valve, said hydraulic control valve including a spool, a spring backing the spool, an oil chamber acting against the spring and receiving the wheel brake pressure, a land of said spool associated with a pair of ports and serving as said pressure increase control valve, and a further land of said spool associated with a pair of ports and serving as said pressure decrease control valve.

2. The antiskid apparatus according to claim 1, wherein said changeover valve is a 3 port—2 position solenoid valve having a first position connecting said master cylinder to said wheel brake and a second position disconnecting said master cylinder from said wheel brake and connecting said wheel brake to said reservoir.

3. The antiskid apparatus according to claim 2, which further includes an electronic control unit and a sensor associated with a wheel, said electronic control unit controlling changeover of said changeover valve between said two modes responsive to the sensor.

4. The antiskid apparatus according to claim 1, wherein a cut off valve is disposed in a connection line between said changeover valve and said master cylinder, the cut off valve including means actuated by the wheel brake pressure for cutting off the connection line when the wheel brake pressure is increased by said pump.

* * * * *